United States Patent
Junker et al.

(10) Patent No.: US 6,905,643 B2
(45) Date of Patent: Jun. 14, 2005

(54) PROCESS FOR MOLDING ON A SUBSTRATE

(75) Inventors: Christian Junker, Kentwood, MI (US); Michael J. Anderson, Allendale, MI (US)

(73) Assignee: Dow Global Technologies Inc., Midland, MI (US)

( * ) Notice: Subject to any disclaimer, the term of this patent is extended or adjusted under 35 U.S.C. 154(b) by 115 days.

(21) Appl. No.: 10/309,981

(22) Filed: Dec. 4, 2002

(65) Prior Publication Data

US 2004/0108614 A1 Jun. 10, 2004

(51) Int. Cl.⁷ .............................................. B29C 45/14
(52) U.S. Cl. .................. 264/46.4; 264/250; 264/265; 264/275; 264/276; 264/296
(58) Field of Search ................................. 264/275, 250, 264/247, 265, 296, 320, 328.9, 46.4, 276

(56) References Cited

U.S. PATENT DOCUMENTS

| | | | |
|---|---|---|---|
| 4,923,077 A | * | 5/1990 | Van Iperen et al. ......... 206/527 |
| 5,114,639 A | | 5/1992 | Kurz et al. |
| 5,306,459 A | * | 4/1994 | Thomason et al. ......... 264/266 |
| 5,543,159 A | | 8/1996 | Iltgen |
| 5,776,402 A | | 7/1998 | Glaesener |
| 6,086,295 A | | 7/2000 | Novak et al. |
| 2004/0129493 A1 | | 7/2004 | Cambell |

FOREIGN PATENT DOCUMENTS

GB 2272857 6/1994

* cited by examiner

Primary Examiner—Edmund H. Lee
(74) Attorney, Agent, or Firm—Price, Heneveld, Cooper & DeWitt & Litton

(57) ABSTRACT

A process of molding a component on a substrate utilizes a substrate having a peripheral flange that projects into a parting line between mold segments defining a mold cavity, wherein the flange has a projecting, continuous circuitous ridge that forms a seal between the substrate and an upper mold segment. The process allows a substantially flash free molded component to be formed directly on a substrate, thus eliminating the need for a separate flash removal step.

11 Claims, 1 Drawing Sheet

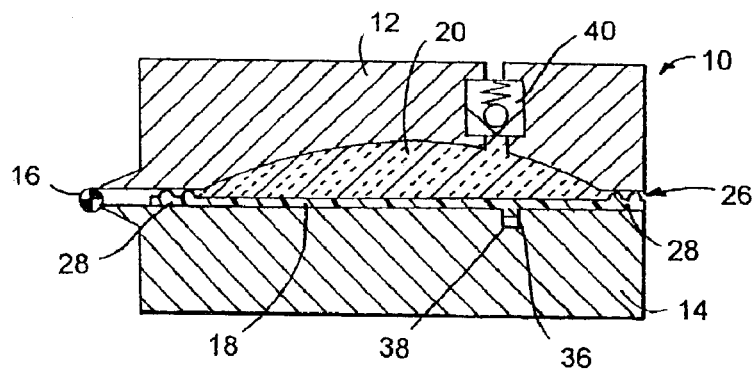
FIG. 1
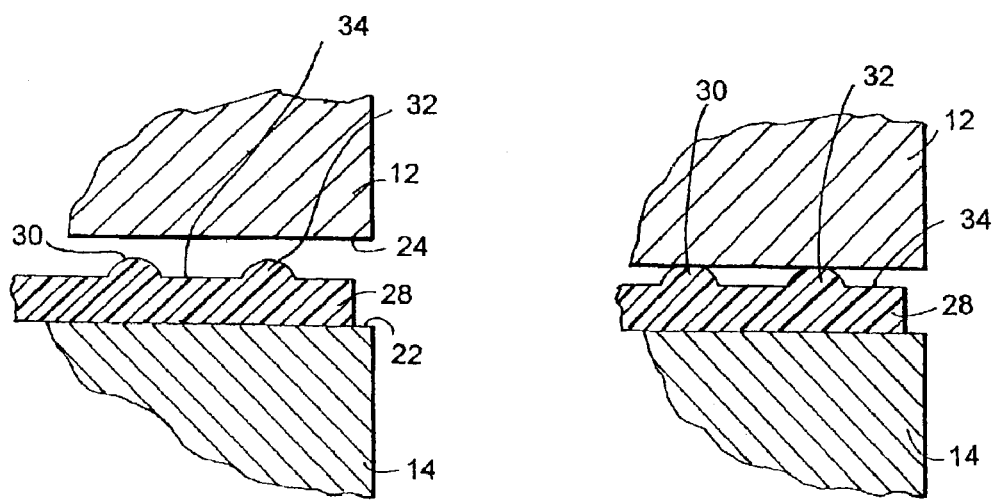
FIG. 2
FIG. 3

PROCESS FOR MOLDING ON A SUBSTRATE

FIELD OF THE INVENTION

This invention relates to injection molding processes, and more particularly to molding on a substrate.

BACKGROUND OF THE INVENTION

Reaction injection molding (RIM) is a process for molding polymeric parts by injecting low molecular weight, reactive, low viscosity liquids at high pressure into a mixing chamber and then into a mold cavity. The liquid reactants polymerize in the mold to form a molded article. Molds used for reaction injection molding, like many molds, comprise at least two segments, which in a mold-closed position, come together to define a mold cavity into which the reactants are injected. The mold segments have complimentary shaped faces which come together when the mold is closed to define a parting line. Unfortunately, there is usually some degree of mismatch between the faces. This mismatch of the mold segments results in the formation of small gaps between the mating faces at the parting line. Such gaps allow liquid mixture injected into the mold cavity to invade the parting line at its edges and produce protrusions, known as "flash", on the finish article.

A particular application for reaction injection molding of a component directly on a substrate is in the production of acoustic barrier systems for motor vehicles. It is common practice in the motor vehicle industry to employ a double wall acoustic barrier arrangement to reduce noise from the engine compartment to the passenger compartment of a motor vehicle. The acoustic barrier system typically includes a metal wall separating the engine compartment from the passenger compartment, and a dash barrier spaced away from the passenger compartment side of the metal wall. A foam (i.e., an expanded thermoplastic material) or fiber sound absorbing or damping material is typically disposed in the space defined between the steel wall and the dash barrier. The dash barrier is typically a panel made of self-supporting, relatively dense, resilient or flexible synthetic plastic material, and the sound absorbing or damping material, also referred to as a decoupler, is typically in the form of a foam sheet or panel, or a fibrous mat. Often, the decoupler panel or mat is attached to the barrier panel prior to installation of the acoustic barrier and decoupler into a vehicle so that the barrier and decoupler are installed as a unit into a vehicle.

A premium process for producing high quality acoustic barrier systems comprising an acoustic barrier panel secured to a foam panel includes steps of injection molding an acoustic barrier panel, and forming the foam panel in a mold cavity directly against a surface of the barrier panel using a reaction injection molding (RIM) technique. Heretofore, it has not been possible to produce a foam RIM part without unwanted thin protrusions (flash) at the edges of the part which were located at the parting line of the mold segments. In order to meet the rigid dimensional and quality requirements common in the automotive industry, the finished parts must generally be free of flash.

Attempts to eliminate flash from RIM parts have generally focused on removing the flash after the molding process has been completed. Various mechanical flash removal apparatuses, cryogenic flash removal methods, and handwork processes have been devised to remove flash from RIM parts. However, these apparatuses and processes have achieved very limited success. Mechanical flash removal apparatuses have generally failed to consistently remove all of the flash material from a RIM part and/or have removed surface material from the RIM part resulting in destruction of texturing or other surface features of the part in the area of the mold seam. Similarly, cryogenic processing and/or handwork processing have not provided consistent satisfactory results due to incomplete removal of all flash material and/or damage to surface features of the RIM part. Further, handwork processes are very time consuming and labor intensive, with as much as about 40% of the total production cost for certain RIM parts being attributable to hand removal of flash material.

A flash-proof RIM mold and method are allegedly disclosed in U.S. Pat. No. 5,543,159. The method involves use of an interlayer film of thermosetting resin disposed on an edge of a parting line at one of a pair of mold segments. The interlayer film acts as a seal between the mating faces of the mold segments to fill any gaps between the mating faces and prevent intrusion of liquid reactants into the parting line during the RIM process. In order to cause the interlayer film to adhere firmly to the face of one mold segment and be readily separable from the face of the other mold segment, the face of a first mold segment is roughened to provide a multiplicity of anchoring sites for the film, and the face of a second mold segment is preferably polished to provide a smooth surface which will facilitate easy separation of the face of the second mold segment from the film. It is desirable to apply a mold release agent to the face of the second mold segment between each molding cycle to ensure release of the second mold segment from the interlayer film sealing the parting line gaps. The interlayer film is installed by depositing a strip or bead of thermosetting resin to the roughened surface of the first mold segment, closing the mold to allow the resin to flow and fill any gaps along the parting line, partially curing the resin while the mold is closed so as to form a material that is sufficiently hard to retain any formed contours after the mold is open, opening the mold, trimming away any material that has exuded into the mold cavity, and completing curing of the resin. It is alleged that the seal may be used to mold as many as about 5,000 parts before repair (i.e., replacement) of the seal is required.

Disadvantages with this process and apparatus include the requirement for modification of the mold segments, the need for applying mold release agents between each molding cycle, and the necessity for periodic removal of the film seal and fabrication of a new seal. Further, it is not evident how the process and apparatus may be adapted or modified for forming a RIM component directly on a thermoplastic substrate located in the mold cavity adjacent cavity surfaces of one of the mold segments.

Accordingly, there is a need for improved processes of reaction injection molding a component on a substrate while preventing or reducing formation of flash.

SUMMARY OF THE INVENTION

The process of the invention allows a substantially flash free molded component to be formed directly on a substrate. The process eliminates the need for a separate flash removal step, allowing the resulting product to be ready for use directly out of the mold without any intervening steps.

In accordance with an aspect of this invention, an improved process of molding a component on a substrate is achieved by providing the substrate with an integral seal that prevents materials introduced into a mold cavity during molding from exuding from the mold cavity and along the parting line between mating faces of first and second mold segments defining a mold cavity. By providing a seal on the substrate upon which the component is formed, a new seal is provided during each molding cycle. This eliminates the need for specially treating mating surfaces on the mold segments (i.e., roughening of one mating surface and polishing of another). The process also eliminates, or at least reduces, the need for treating the mating surface of at least one of the mold segments with a release agent. Further, the process of the invention substantially reduces or eliminates flash formation during molding without requiring frequent monitoring and replacement of a multiple use seal anchored to one of the mold segments. The process of this invention is inherently adapted for molding a component on a substrate.

In accordance with a particular aspect of the invention, there is provided a process of molding a component on a substrate by providing first and second mating mold segments that, when in a closed position, define a mold cavity for receiving a liquid mixture of reactants; providing a substrate having a contoured surface which conforms with mold cavity defining surfaces of the first mold segment, the substrate having a peripheral flange conforming with the complementary shaped faces of the mold segments, the peripheral flange including at least one continuous circuitous ridge that projects from a surface of the flange; positioning the substrate it the first mold segment, closing the mold; introducing moldable material into a mold cavity defined by the closed mold; allowing the moldable material to solidify and form a molded component; opening the mold; and removing an article including the substrate and an integral molded component which is substantially free of flash.

These and other features, advantages and objects of the present invention will be further understood and appreciated by those skilled in the art by reference to the following specification, claims and appended drawings.

BRIEF DESCRIPTION OF THE DRAWINGS

FIG. 1 is a cross-sectional view of a molding apparatus suitable for use in practicing the invention.

FIG. 2 is an expanded, partial cross-sectional view of the apparatus of FIG. 1, showing details at the mold parting line when the mold is open.

FIG. 3 is an expanded, partial cross-sectional view of the apparatus of FIG. 1, showing details at the mold parting line when the mold is closed.

DESCRIPTION OF THE PREFERRED EMBODIMENTS

In FIG. 1, there is shown a cross-sectional view of a mold 10 comprising a mold segment 12, and a mold segment 14. Mold segments 12 and 14 are hinged together with a precision open/close mechanism 16. When the mold 10 is closed, as shown in FIG. 1, mold segment 12 and mold segment 14 together define a mold cavity in which an injection molded thermoplastic substrate 18 is disposed, and in which a mixture of liquid reactants is injected and reacted to form a molded component 20 which conforms with the remaining shape of the mold cavity that is not occupied by substrate 18. Mold segments 12 and 14 have complementary shaped faces 22 and 24 that mate with each other at a parting line 26.

Substrate 18 has a contoured surface which conforms with mold cavity defining surfaces of mold segment 12. In the illustrated embodiment, substrate 18 is a substantially flat panel or sheet, and mold segment 12 has a substantially flat surface conforming with the shape of substrate 18. Substrate 18 also has a peripheral flange 28 which has a shape conforming with the complementary shaped mating faces 22 and 24 of mold segments 14 and 12, respectively. Mating faces 22 and 24 define a parting line or plane that extends circumferentially around the mold cavity defined by mold segments 12 and 14. Peripheral flange 28 extends continuously in a circumferential loop into a small gap defined between mating faces 22 and 24.

As shown in greater detail in FIGS. 3 and 4, peripheral flange 28 includes two continuous circuitous lips or ridges 30 and 32 that project from an upwardly facing surface 34 of substrate 18. Ridges 30 and 32 are integrally formed features of substrate 18. Ridges 30 and 32 define concentric continuous protuberances which circumscribe the mold cavity, and which are disposed within the small gap between mating faces 22 and 24 of mold segments 14 and 12, respectively. As shown in the Figures, ridges 30 and 32 have a continuously curved transverse profile, and more particularly, a semi-circular transverse profile. Upon closing of mold 10, as illustrated in FIG. 3, mating face 24 of upper mold segment 12 engages ridges 30 and 32, causing ridges 30 and 32 to become slightly deformed, i.e., compressed and flattened at the apex thereof, whereby two concentric peripheral seals are developed between mold segment 14 and ridges 30 and 32. This sealing mechanism redefines a sealed mold cavity between substrate 18 and mold segment 14.

In order to provide a suitable seal for preventing the reactant mixture injected into the mold cavity during the RIM process, substrate 18, and therefore integral ridges 30 and 32, is made of a material that exhibits suitable compressibility and deformability to provide a sealing function. Examples of suitable substrate materials that are capable of performing the required sealing function include various thermoplastic or elastomeric materials, such as thermoplastic olefins, rubber modified polypropylene, elastomer-modified polyurethanes, elastomer-modified polyamides, etc. The substrate materials may contain fillers and/or reinforcing materials such as fibers, along with other conventional additives.

Desirably, substrate 18 is a part having very precise dimensions to insure precise engagement with the mold segments and excellent sealing with the mold segments. While it is conceivable that other techniques may be employed for fabricating substrate 18, injection molding provides a suitable technique for economically forming a substrate 18 having the required precise dimensions.

In order to precisely locate substrate 18 within the mold cavity defined between mold segments 12 and 14, substrate 18 is desirably formed with one or more locator features 36 which come into registry with a slot or recess 38 defined on the mold cavity defining surface of upper mold segment 12.

Molded component 20 may be formed using generally any combination of liquid reactants suitable for reaction injection molding technique. The resulting component 20 may either be comprised of a substantially continuous solid material, or blowing agents may be introduced into the mold cavity along with the liquid reactants to form an expanded plastic material or foam having either open or closed cells containing a gas.

During conventional RIM processes a relatively precise quantity of liquid reactants is introduced into the mold cavity, with a small overage escaping along the parting line to form flash. In accordance with the principles of this invention, flash is prevented or significantly reduced by the sealing action of ridges 30 and/or 32. Accordingly, any excess liquid reactant injected into the mold cavity could result in high pressures that are sufficient to damage the mold. Therefore, it is desirable to provide lower mold segment 14 with a pressure relief valve 40 that will prevent unacceptably high pressures from building up within the mold cavity.

Molded component 20 may be secured to substrate 18 during the RIM process by development of adhesion between substrate 18 and component 20 during the RIM process and/or by physical entrapment of protruding anchor features (not shown) integrally formed, or attached to, substrate 18.

In the illustrated embodiment, substrate 18 represents an acoustic barrier that is, for example, injection molded from a filled thermoplastic material having elastomeric properties, and component 20 represents a plastic foam sound absorbing or decoupling material, such as a polyurethane foam material. The resulting combination of acoustic barrier substrate 18 secured to foam material 20 is useful as an acoustic barrier system that may be installed as a unit on the passenger side of a metal wall separating an engine compartment from a passenger compartment of a motor vehicle. The invention allows foam component 20 to be formed on and secured to barrier substrate 18 without requiring any separate steps for attaching foam component 20 to barrier substrate 18, and without requiring any steps for removing flash subsequent to reaction injection molding of component 20. However, the illustrated embodiment only represents a particular useful application for the invention. Other advantageous applications of the invention will be readily apparent to those skilled in the art.

The process of reaction injection molding a component on a substrate in accordance with the principles of this invention involves first positioning the substrate in the lower segment 14 such that the contoured surfaces of substrate 18 and the mold cavity defining surfaces of mold segment 14 are in conforming registry, and with the peripheral flanges of substrate 18 engaging the mating face 22 of mold segment 14. Thereafter, mold 10 is closed by pivoting mold segment 12 around open/close hinge mechanism 16 into the closed position shown in FIG. 1. This causes peripheral flange 28, including ridges 30 and 32, to become compressed. More specifically, engagement between mating face 24 of mold segment 12 causes ridges 30 and 32 to become compressed and deform, whereby a sealing engagement is achieved between mating face 24 of mold segment 12 and ridges 30 and 32. After the mold cavity has been sealed by engagement between mating face 22 and ridges 30 and 32, a mixture of liquid reactants is injected into the mold cavity and allowed to polymerize to form molded component 20 which conforms with the shape of the mold cavity. The mold is then opened and the composite article comprising the molded component 20 and substrate 18 is removed.

While the invention is particularly well suited for reaction injection molding processes, the processes of this invention may be employed in other applications in which a component is molded (shaped in a mold cavity) on a substrate.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A process of molding a component on a substrate, comprising:

providing first and second mating mold segments having surfaces that, when in a closed position, define a mold cavity, the mold segments having complementary shaped faces that mate with each other at a parting line;

providing a substrate having a contoured surface that conforms with the mold cavity defining surfaces of the first mold segment, the substrate having a peripheral flange conforming with the complementary shaped faces of the mold segments, the peripheral flange including at least one continuous circuitous ridge that projects from a surface of the flange;

positioning the substrate in the first mold segment with the contoured surfaces of the substrate in registry with the mold cavity defining surfaces of the first mold segment, and with the peripheral flanges of the substrate overlapping and engaging the mating face of the first mold segment;

closing the mold and compressing the flange between the mating faces of the mold segments so that the mating face of the second mold segment engages and deforms the ridges of the flange to provide a peripheral seal along the parting line;

introducing a moldable material into a volume defined between the substrate and the second mold segment;

allowing the moldable material to solidify and form a molded component conforming with the shape of the volume defined between the substrate and the second mold segment;

opening the mold; and removing an article including the substrate and the molded component secured to the substrate.

2. The process of claim 1, further comprising providing the ridge with a continuously curved transverse profile.

3. The process of claim 1, further comprising providing the ridge with a semi-circular transverse profile.

4. The process of claim 1, further comprising providing the flange with at least two concentric continuous circuitous ridges.

5. The process of claim 1, further comprising introducing blowing agents into the mold cavity along with the moldable material, whereby the resulting molded component is a foam material.

6. The process of claim 1, further comprising providing the second mold segment with a pressure relief valve.

7. The process of claim 1, further comprising making the substrate of a thermoplastic substrate.

8. The process of claim 1, further comprising making the substrate by injection molding.

9. The process of claim 1, further comprising providing the substrate with a projecting locator feature and providing a complementary feature defined on the first mold segment to facilitate precise registry of the substrate with the first mold segment.

10. The process of claim 1, further comprising making the substrate of an injection molded thermoplastic material, and the molded component of a foam material.

11. The process of claim 1, further comprising preparing the moldable material from a liquid mixture of reactants, injecting the liquid mixture of reactants into the mold cavity, and allowing the liquid mixture of reactants to polymerize and solidify in the mold cavity.

* * * * *

UNITED STATES PATENT AND TRADEMARK OFFICE
CERTIFICATE OF CORRECTION

PATENT NO. : 6,905,643 B2
DATED : June 14, 2005
INVENTOR(S) : Christian Junker et al.

It is certified that error appears in the above-identified patent and that said Letters Patent is hereby corrected as shown below:

Column 6,
Line 59, after "and" insert -- making --.

Signed and Sealed this

Eighth Day of November, 2005

JON W. DUDAS
*Director of the United States Patent and Trademark Office*